United States Patent
Chatterji et al.

(10) Patent No.: US 12,400,130 B2
(45) Date of Patent: Aug. 26, 2025

(54) EXTENSIBLE OBJECT MODEL AND GRAPHICAL USER INTERFACE ENABLING MODELING

(71) Applicant: Honeywell International Inc., Charlotte, NC (US)

(72) Inventors: Agniraj Chatterji, Atlanta, GA (US); Roshan Lawrence Valder, Bangalore (IN); Debashish Sahu, Bhubaneswar (IN); Aaron Francis Dsouza, Bangalore (IN); Sanjaykumar Patil, Pleasanton, CA (US); Manu Taranath, Bangalore (IN); Klaus Peter Gross, Atlanta, GA (US); Murugan Gopalan, Bangalore (IN); Vidya Shivamurthy, Arsiker (IN); Muthu Sabarethinam, Atlanta, GA (US)

(73) Assignee: HONEYWELL INTERNATIONAL, INC., Charlotte, NC (US)

( * ) Notice: Subject to any disclaimer, the term of this patent is extended or adjusted under 35 U.S.C. 154(b) by 986 days.

(21) Appl. No.: 17/451,070

(22) Filed: Oct. 15, 2021

(65) Prior Publication Data
US 2022/0121965 A1    Apr. 21, 2022

Related U.S. Application Data

(60) Provisional application No. 63/093,121, filed on Oct. 16, 2020.

(51) Int. Cl.
*G06F 3/048* (2013.01)
*G06N 5/022* (2023.01)
(Continued)

(52) U.S. Cl.
CPC .......... *G06N 5/022* (2013.01); *G06F 3/0482* (2013.01); *G06F 3/04847* (2013.01); *G16Y 40/20* (2020.01)

(58) Field of Classification Search
None
See application file for complete search history.

(56) References Cited

U.S. PATENT DOCUMENTS 6,182,094 B1 * 1/2001 Humpleman ........... H04L 67/01
                                                        348/E5.006
7,720,779 B1    5/2010 Perry et al.
(Continued)

FOREIGN PATENT DOCUMENTS

JP    2010-122847 A    6/2010
JP    2017-194730 A    10/2017
(Continued)

OTHER PUBLICATIONS

International Search Report and Written Opinion issued in PCT/US2021/055194 on Jan. 20, 2022.
(Continued)

*Primary Examiner* — Thanh T Vu
(74) *Attorney, Agent, or Firm* — ALSTON & BIRD LLP

(57) ABSTRACT

A method includes obtaining a relational model, the relational model comprising a plurality of nodes and a plurality of links, each of the links of the plurality of links connecting one or more nodes of the plurality of nodes, and each link corresponding to a relationship between a first node and a second node, receiving a request to update the relational model, the request comprising information corresponding to an added and/or edited first node, determining a first probability that the first node is in a relationship with a second node and a second probability that the first node is in a relationship with a third node, and updating the relational model to include the relationship between the first node and
(Continued)

the second node at the first probability and the relationship between the first node and the third node at the second probability.

20 Claims, 10 Drawing Sheets

(51) Int. Cl.
*G06F 3/0482* (2013.01)
*G06F 3/04847* (2022.01)
*G16Y 40/20* (2020.01)

(56) References Cited

U.S. PATENT DOCUMENTS

| | | | |
|---|---|---|---|
| 7,788,238 | B2 | 8/2010 | Gabriel et al. |
| 7,895,568 | B1 | 2/2011 | Goodwin et al. |
| 9,015,593 | B2 * | 4/2015 | Berg ..................... G06F 8/34 709/224 |
| 9,823,907 | B2 | 11/2017 | Copass et al. |
| 2011/0264424 | A1 | 10/2011 | Miwa et al. |
| 2013/0080350 | A1 | 3/2013 | Bhola et al. |
| 2017/0006135 | A1 | 1/2017 | Siebel et al. |
| 2018/0040064 | A1 | 2/2018 | Grigg et al. |
| 2018/0307219 | A1 | 10/2018 | Horiwaki et al. |
| 2019/0265971 | A1 | 8/2019 | Behzadi et al. |
| 2020/0159173 | A1 * | 5/2020 | Goyal .................. G06F 16/242 |
| 2022/0050874 | A1 * | 2/2022 | Jarett .................. G06F 16/9024 |
| 2023/0160809 | A1 | 5/2023 | Im et al. |

FOREIGN PATENT DOCUMENTS

| | | |
|---|---|---|
| JP | 2018-181158 A | 11/2018 |
| JP | 2023-521872 A | 5/2023 |

OTHER PUBLICATIONS

AU Office Action Mailed on Oct. 31, 2023 for AU Application No. 2021361062, 6 page(s).
IPEA/409—International Preliminary Report on Patentability Mailed on Apr. 27, 2023 for WO Application No. PCT/US21/055194, 10 page(s).
English translation of JP Decision to Grant dated Dec. 24, 2024 for JP Application No. 2023521872, 2 page(s).
JP Decision to Grant Mailed on Dec. 24, 2024 for JP Application No. 2023521872, 3 page(s).
SA Office Action Mailed on Jan. 21, 2025 for SA Application No. 523440378, 17 page(s).
English Translation of JP Office Action dated Jun. 28, 2024 for JP Application No. 2023521872, 4 page(s).
JP Office Action Mailed on Jun. 28, 2024 for JP Application No. 2023521872, 4 page(s).

* cited by examiner

EXTENSIBLE OBJECT MODEL AND GRAPHICAL USER INTERFACE ENABLING MODELING

CROSS-REFERENCE TO RELATED APPLICATIONS

This patent application claims the benefit of priority to U.S. Provisional Application No. 63/093,121, filed on Oct. 16, 2020, the entirety of which is incorporated herein by reference.

INTRODUCTION

Various embodiments of the present disclosure relate generally to an extensible object model. More specifically, particular embodiments of the present disclosure relate to systems and methods for obtaining, creating and updating an extensible object model.

SUMMARY

According to certain aspects of the present disclosure, systems and methods are disclosed for obtaining and updating an extensible object model.

A method, includes: obtaining a relational model, the relational model comprising a plurality of nodes and a plurality of links, each of the links of the plurality of links connecting one or more nodes of the plurality of links, and each link corresponding to a relationship between a first node and a second node; receiving a request to update the relational model, the request comprising information corresponding to an added and/or edited first node; determining a first probability that the first node is in a relationship with a second node and a second probability that the first node is in a relationship with a third node; and updating the relational model to include the relationship between the first node and the second node at the first probability and the relationship between the first node and the third node at the second probability.

A system, including: a processor; and a memory, the processor: obtaining a relational model, the relational model comprising a plurality of nodes and a plurality of links, each of the links of the plurality of links connecting one or more nodes of the plurality of nodes, and each link corresponding to a relationship between a first node and a second node; receiving a request to update the relational model, the request comprising information corresponding to an added and/or edited first node; determining a first probability that the first node is in a relationship with a second node and a second probability that the first node is in a relationship with a third node; and updating the relational model to include the relationship between the first node and the second node at the first probability and the relationship between the first node and the third node at the second probability.

A non-transitory computer-readable medium storing instructions that, when executed by a processor, cause the processor to perform a method of: obtaining a relational model, the relational model comprising a plurality of nodes and a plurality of links, each of the links of the plurality of links connecting one or more nodes of the plurality of nodes, and each link corresponding to a relationship between a first node and a second node; receiving a request to update the relational model, the request comprising information corresponding to an added and/or edited first node; determining a first probability that the first node is in a relationship with a second node and a second probability that the first node is in a relationship with a third node; and updating the relational model to include the relationship between the first node and the second node at the first probability and the relationship between the first node and the third node at the second probability.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments may be practiced without these specific details. In other instances, well-known methods, procedures, components, circuits, and networks have not been described in detail so as not to unnecessarily obscure aspects of the embodiments.

In general, the present disclosure provides for an "Internet-of-Things" or "IoT" platform for enterprise performance management that uses real-time accurate models and visual analytics to deliver intelligent actionable recommendations for sustained peak performance of an enterprise or organization. The IoT platform is an extensible platform that is portable for deployment in any cloud or data center environment for providing an enterprise-wide, top to bottom view, displaying the status of processes, nodes, people, and safety. Further, the IoT platform of the present disclosure supports end-to-end capability to execute digital twins against process data and to translate the output into actionable insights, as detailed in the following description.

The IoT platform may include a number of layers including, for example, an extensible object model (EOM) that includes one or more knowledge graphs. The EOM may be a collection of application programming interfaces (APIs) that enables a seeded semantic object model to be extended. The extensible object model further enables a customer's knowledge graph to be built subject to the constraints expressed in the customer's semantic object model. A knowledge graph describes real world entities and their interrelations, organized in a graph. A knowledge graph defines possible classes and relations of entities in a schema, and enables the interrelating of potentially arbitrary entities and (iv) covers various topical domains. Knowledge graphs may include large networks of entities, their semantic types, properties, and relationships between entities. The entities may be physical entities or non-physical entities, such as data.

Figure 1:
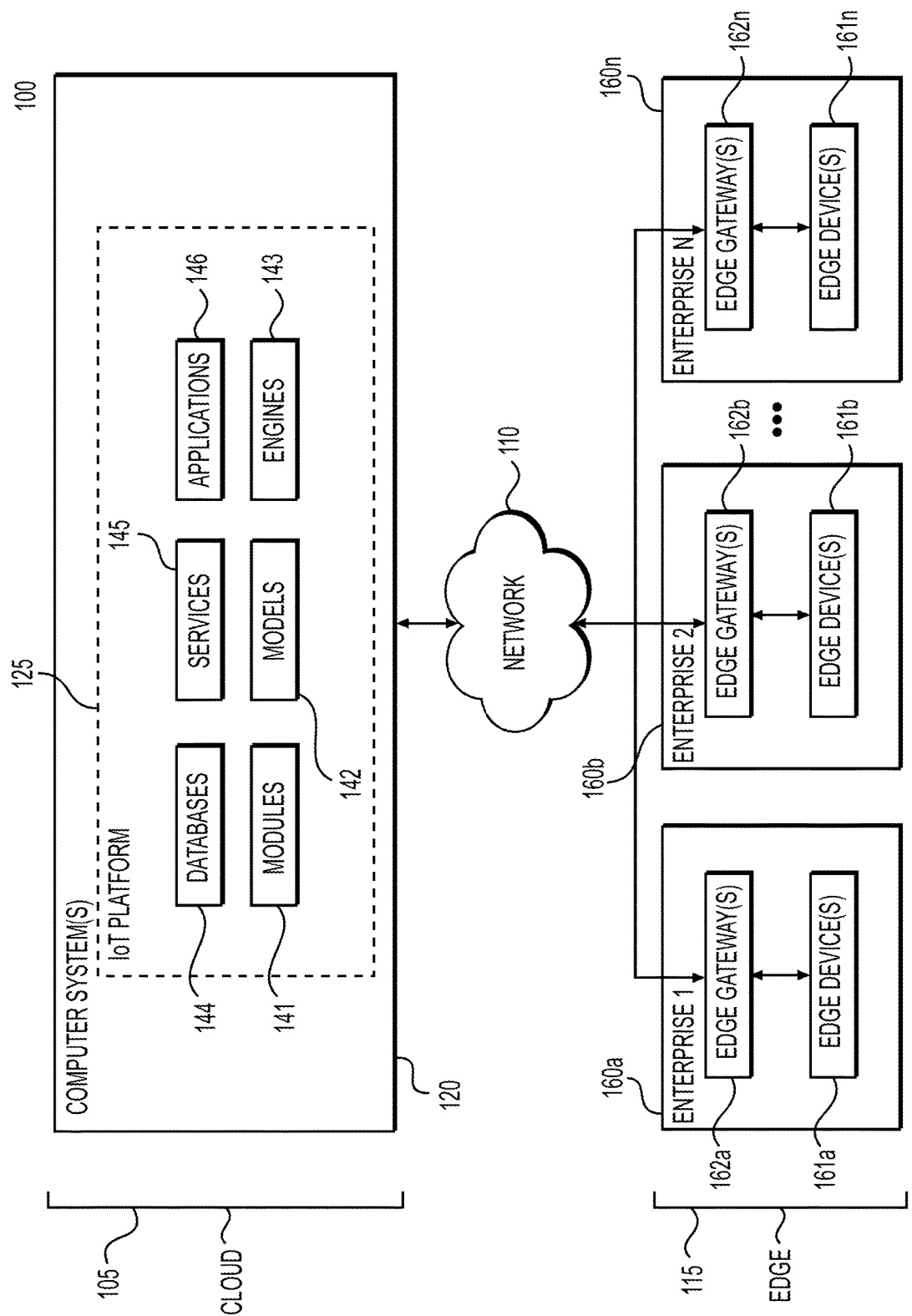
FIG. 1 depicts an exemplary networked computing system environment, according to one or more embodiments.

FIG. 1 illustrates an exemplary networked computing system environment 100, according to the present disclosure. As shown in FIG. 1, networked computing system environment 100 is organized into a plurality of layers including a cloud layer 105, a network layer 110, and an edge layer 115. As detailed further below, components of the edge 115 are in communication with components of the cloud 105 via network 110.

Network 110 may be any suitable network or combination of networks and may support any appropriate protocol suitable for communication of data to and from components of the cloud 105 and between various other components in the networked computing system environment 100 (e.g., components of the edge 115). Network 110 may include a public network (e.g., the Internet), a private network (e.g., a network within an organization), or a combination of public and/or private networks. Network 110 may be configured to provide communication between various components depicted in FIG. 1. Network 110 may comprise one or more networks that connect devices and/or components in the network layout to allow communication between the devices and/or components. For example, the network 110 may be implemented as the Internet, a wireless network, a wired network (e.g., Ethernet), a local area network (LAN), a Wide Area Network (WANs), Bluetooth, Near Field Communication (NFC), or any other type of network that provides communications between one or more components of the network layout. In some embodiments, network 110 may be implemented using cellular networks, satellite, licensed radio, or a combination of cellular, satellite, licensed radio, and/or unlicensed radio networks.

Components of the cloud 105 include one or more computer systems 120 that form a so-called "Internet-of-Things" or "IoT" platform 125. It should be appreciated that "IoT platform" is an optional term describing a platform connecting any type of Internet-connected device, and should not be construed as limiting on the types of computing systems useable within IoT platform 125. In particular, computer systems 120 may include any type or quantity of one or more processors and one or more data storage devices comprising memory for storing and executing applications or software modules of networked computing system environment 100. In one embodiment, the processors and data storage devices are embodied in server-class hardware, such as enterprise-level servers. For example, the processors and data storage devices may comprise any type or combination of application servers, communication servers, web servers, supercomputing servers, database servers, file servers, mail servers, proxy servers, and/virtual servers. Further, the one or more processors are configured to access the memory and execute processor-readable instructions, which when executed by the processors configures the processors to perform a plurality of functions of the networked computing system environment 100.

Computer systems 120 further include one or more software components of the IoT platform 125. For example, the software components of computer systems 120 may include one or more software modules to communicate with user devices and/or other computing devices through network 110. For example, the software components may include one or more modules 141, models 142, engines 143, databases 144, services 145, and/or applications 146, which may be stored in/by the computer systems 120 (e.g., stored on the memory), as detailed with respect to FIG. 2 below. The one or more processors may be configured to utilize the one or more modules 141, models 142, engines 143, databases 144, services 145, and/or applications 146 when performing various methods described in this disclosure.

Accordingly, computer systems 120 may execute a cloud computing platform (e.g., IoT platform 125) with scalable resources for computation and/or data storage, and may run one or more applications on the cloud computing platform to perform various computer-implemented methods described in this disclosure. In some embodiments, some of the modules 141, models 142, engines 143, databases 144, services 145, and/or applications 146 may be combined to form fewer modules, models, engines, databases, services, and/or applications. In some embodiments, some of the modules 141, models 142, engines 143, databases 144, services 145, and/or applications 146 may be separated into separate, more numerous modules, models, engines, databases, services, and/or applications. In some embodiments, some of the modules 141, models 142, engines 143, databases 144, services 145, and/or applications 146 may be removed while others may be added.

The computer systems 120 are configured to receive data from other components (e.g., components of the edge 115) of networked computing system environment 100 via network 110. Computer systems 120 are further configured to utilize the received data to produce a result. Information indicating the result may be transmitted to users via user computing devices over network 110. In some embodiments, the computer systems 120 may be referred to as a server system that provides one or more services including providing the information indicating the received data and/or the result(s) to the users. Computer systems 120 are part of an entity, which may include any type of company, organization, or institution that implements one or more IoT services. In some examples, the entity may be an IoT platform provider.

Components of the edge 115 include one or more enterprises 160a-160n each including one or more edge devices 161a-161n and one or more edge gateways 162a-162n. For example, a first enterprise 160a includes first edge devices 161a and first edge gateways 162a, a second enterprise 160b includes second edge devices 161b and second edge gateways 162b, and an nth enterprise 160n includes nth edge devices 161n and nth edge gateways 162n. As used herein, enterprises 160a-160n may represent any type of entity, facility, or vehicle, such as, for example, companies, divisions, buildings, manufacturing plants, warehouses, real estate facilities, laboratories, aircraft, spacecraft, automobiles, ships, boats, military vehicles, oil and gas facilities, or any other type of entity, facility, and/or vehicle that includes any number of local devices.

Figure 2:
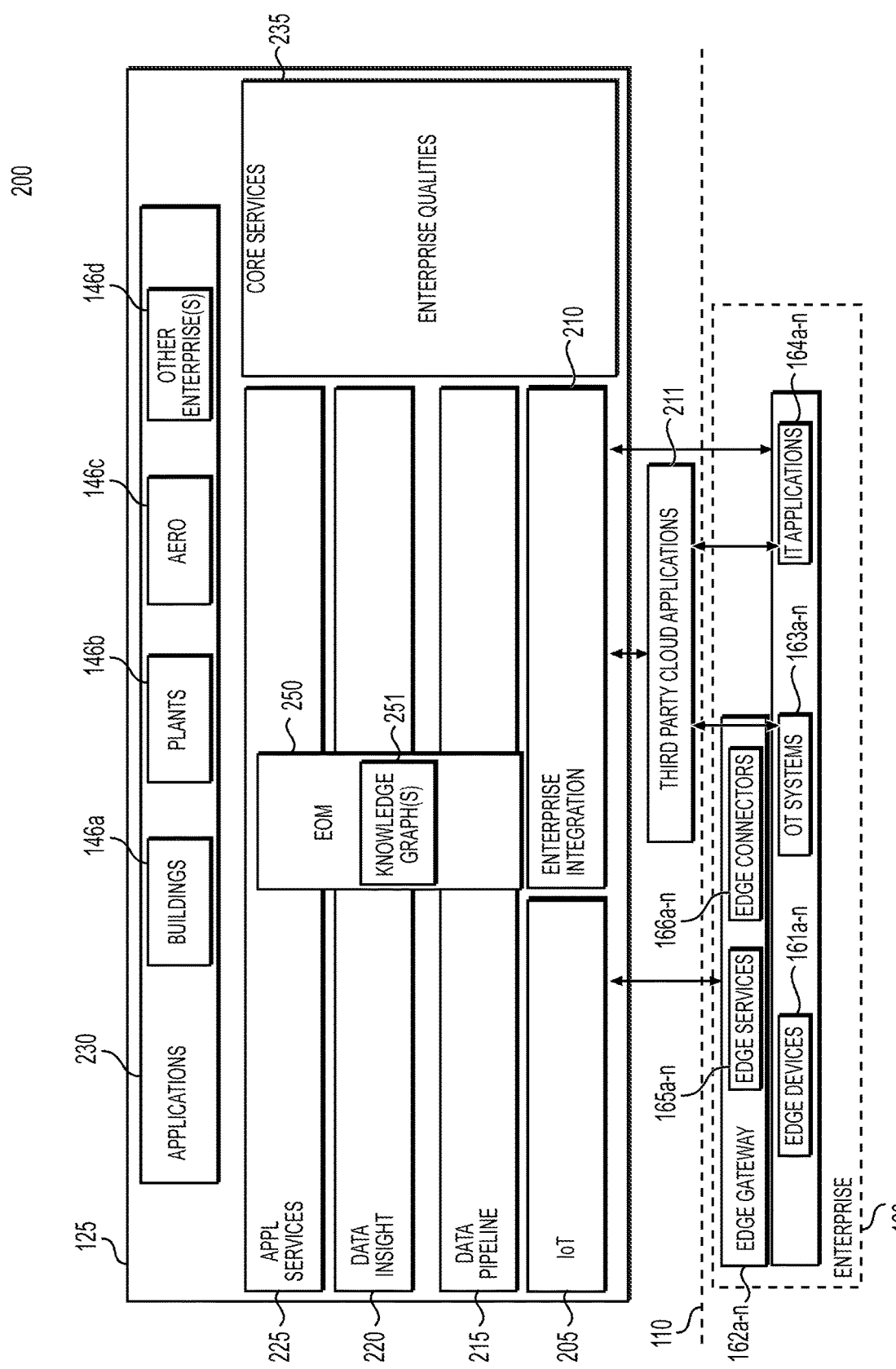
FIG. 2 depicts a schematic block diagram of a framework of an Internet-of-Things (IoT) platform of the networked computing system environment of FIG. 1, the IoT platform comprising one or more extensible object models ("EOM").

The edge devices 161a-161n may represent any of a variety of different types of devices that may be found within the enterprises 160a-160n. Edge devices 161a-161n are any type of device configured to access network 110, or be accessed by other devices through network 110, such as via an edge gateway 162a-162n. Edge devices 161a-161n may be referred to in some cases as "IoT devices," which may therefore include any type of network-connected (e.g., Internet-connected) device. For example, the edge devices 161a-161n may include sensors, actuators, processors, computers, valves, pumps, ducts, vehicle components, cameras, displays, doors, windows, security components, HVAC components, factory equipment, and/or any other devices that may be connected to the network 110 for collecting, sending, and/or receiving information. Each edge device 161a-161n includes, or is otherwise in communication with, one or more controllers for selectively controlling a respective edge device 161a-161n and/or for sending/receiving information between the edge devices 161a-161n and the cloud 105 via network 110. With reference to FIG. 2, the edge 115 may also include operational technology (OT) systems 163a-163n and information technology (IT) applications 164a-164n of each enterprise 161a-161n. The OT systems 163a-163n include hardware and software for detecting and/or causing a change, through the direct monitoring and/or control of industrial equipment (e.g., edge devices 161a-161n), nodes, processes, and/or events. The IT applications 164a-164n includes network, storage, and computing resources for the generation, management, storage, and delivery of data throughout and between organizations.

The edge gateways 162a-162n include devices for facilitating communication between the edge devices 161a-161n and the cloud 105 via network 110. For example, the edge gateways 162a-162n include one or more communication interfaces for communicating with the edge devices 161a-161n and for communicating with the cloud 105 via network 110. The communication interfaces of the edge gateways 162a-162n may include one or more cellular radios, Bluetooth, WiFi, near-field communication radios, Ethernet, or other appropriate communication devices for transmitting and receiving information. Multiple communication interfaces may be included in each gateway 162a-162n for providing multiple forms of communication between the edge devices 161a-161n, the gateways 162a-162n, and the cloud 105 via network 110. For example, communication may be achieved with the edge devices 161a-161n and/or the network 110 through wireless communication (e.g., WiFi, radio communication, etc.) and/or a wired data connection (e.g., a universal serial bus, an onboard diagnostic system, etc.) or other communication modes, such as a local area network (LAN), wide area network (WAN) such as the Internet, a telecommunications network, a data network, or any other type of network.

The edge gateways 162a-162n may also include a processor and memory for storing and executing program instructions to facilitate data processing. For example, the edge gateways 162a-162n can be configured to receive data from the edge devices 161a-161n and process the data prior to sending the data to the cloud 105. Accordingly, the edge gateways 162a-162n may include one or more software modules or components for providing data processing services and/or other services or methods of the present disclosure. With reference to FIG. 2, each edge gateway 162a-162n includes edge services 165a-165n and edge connectors 166a-166n. The edge services 165a-165n may include hardware and software components for processing the data from the edge devices 161a-161n. The edge connectors 166a-166n may include hardware and software components for facilitating communication between the edge gateway 162a-162n and the cloud 105 via network 110, as detailed above. In some cases, any of edge devices 161a-n, edge connectors 166a-n, and edge gateways 162a-n may have their functionality combined, omitted, or separated into any combination of devices. In other words, an edge device and its connector and gateway need not necessarily be discrete devices.

FIG. 2 illustrates a schematic block diagram of framework 200 of the IoT platform 125, according to the present disclosure. The IoT platform 125 of the present disclosure is a platform for enterprise performance management that uses real-time accurate models and visual analytics to deliver intelligent actionable recommendations for sustained peak performance of the enterprise 160a-160n. The IoT platform 125 is an extensible platform that is portable for deployment in any cloud or data center environment for providing an enterprise-wide, top to bottom view, displaying the status of processes, nodes, people, and safety. Further, the IoT platform 125 supports end-to-end capability to execute digital twins against process data and to translate the output into actionable insights, using the framework 200, detailed further below.

As shown in FIG. 2, the framework 200 of the IoT platform 125 comprises a number of layers including, for example, an IoT layer 205, an enterprise integration layer 210, a data pipeline layer 215, a data insight layer 220, an application services layer 225, and an applications layer 230. The IoT platform 125 also includes a core services layer 235 and an extensible object model (EOM) 250 comprising one or more knowledge graphs 251. The layers 205-235 further include various software components that together form each layer 205-235. For example, each layer 205-235 may include one or more of the modules 141, models 142, engines 143, databases 144, services 145, applications 146, or combinations thereof. In some embodiments, the layers 205-235 may be combined to form fewer layers. In some embodiments, some of the layers 205-235 may be separated into separate, more numerous layers. In some embodiments, some of the layers 205-235 may be removed while others may be added.

The IoT platform 125 is a model-driven architecture. Thus, the extensible object model 250 communicates with each layer 205-230 to contextualize site data of the enterprise 160a-160n using an extensible object model (or "node model") and knowledge graphs 251 where the equipment (e.g., edge devices 161a-161n) and processes of the enterprise 160a-160n are modeled. The knowledge graphs 251 of EOM 250 are configured to store the models in a central location. The knowledge graphs 251 define a collection of nodes and links that describe real-world connections that enable smart systems. As used herein, a knowledge graph

251: (i) describes real-world entities (e.g., edge devices 161*a*-161*n*) and their interrelations organized in a graphical interface; (ii) defines possible classes and relations of entities in a schema; (iii) enables interrelating arbitrary entities with each other; and (iv) covers various topical domains. In other words, the knowledge graphs 251 define large networks of entities (e.g., edge devices 161*a*-161*n*), semantic types of the entities, properties of the entities, and relationships between the entities. Thus, the knowledge graphs 251 describe a network of "things" that are relevant to a specific domain or to an enterprise or organization. Knowledge graphs 251 are not limited to abstract concepts and relations, but can also contain instances of objects, such as, for example, documents and datasets. In some embodiments, the knowledge graphs 251 may include resource description framework (RDF) graphs. As used herein, a "RDF graph" is a graph data model that formally describes the semantics, or meaning, of information. The RDF graph can also represent metadata (e.g., data that describes data). Knowledge graphs 251 can also include a semantic object model. The semantic object model is a subset of a knowledge graph 251 that defines semantics for the knowledge graph 251. For example, the semantic object model defines the schema for the knowledge graph 251.

As used herein, EOM 250 is a collection of application programming interfaces (APIs) that enables seeded semantic object models to be extended. For example, the EOM 250 of the present disclosure enables a customer's knowledge graph 251 to be built subject to constraints expressed in the customer's semantic object model. Thus, the knowledge graphs 251 are generated by customers (e.g., enterprises or organizations) to create models of the edge devices 161*a*-161*n* of an enterprise 160*a*-160*n*, and the knowledge graphs 251 are input into the EOM 250 for visualizing the models (e.g., the nodes and links).

The models describe the nodes (e.g., the nodes) of an enterprise (e.g., the edge devices 161*a*-161*n*) and describe the relationship of the nodes with other components (e.g., the links). The models also describe the schema (e.g., describe what the data is), and therefore the models are self-validating. For example, the model can describe the type of sensors mounted on any given node (e.g., edge device 161*a*-161*n*) and the type of data that is being sensed by each sensor. A key performance indicator (KPI) framework can be used to bind properties of the nodes in the extensible object model 250 to inputs of the KPI framework. Accordingly, the IoT platform 125 is an extensible, model-driven end-to-end stack including: two-way model sync and secure data exchange between the edge 115 and the cloud 105, metadata driven data processing (e.g., rules, calculations, and aggregations), and model driven visualizations and applications. As used herein, "extensible" refers to the ability to extend a data model to include new properties/columns/fields, new classes/tables, and new relations. Thus, the IoT platform 125 is extensible with regards to edge devices 161*a*-161*n* and the applications 146 that handle those devices 161*a*-161*n*. For example, when new edge devices 161*a*-161*n* are added to an enterprise 160*a*-160*n* system, the new devices 161*a*-161*n* will automatically appear in the IoT platform 125 so that the corresponding applications 146 can understand and use the data from the new devices 161*a*-161*n*.

In some cases, node templates are used to facilitate configuration of instances of edge devices 161*a*-161*n* in the model using common structures. A node template defines the typical properties for the edge devices 161*a*-161*n* of a given enterprise 160*a*-160*n* for a certain type of device. For example, a node template of a pump includes modeling the pump having inlet and outlet pressures, speed, flow, etc. The templates may also include hierarchical or derived types of edge devices 161*a*-161*n* to accommodate variations of a base type of device 161*a*-161*n*. For example, a reciprocating pump is a specialization of a base pump type and would include additional properties in the template. Instances of the edge device 161*a*-161*n* in the model are configured to match the actual, physical devices of the enterprise 160*a*-160*n* using the templates to define expected attributes of the device 161*a*-161*n*. Each attribute is configured either as a static value (e.g., capacity is 1000 BPH) or with a reference to a time series tag that provides the value. The knowledge graph 251 can automatically map the tag to the attribute based on naming conventions, parsing, and matching the tag and attribute descriptions and/or by comparing the behavior of the time series data with expected behavior.

The modeling phase includes an onboarding process for syncing the models between the edge 115 and the cloud 105. For example, the onboarding process can include a simple onboarding process, a complex onboarding process, and/or a standardized rollout process. The simple onboarding process includes the knowledge graph 251 receiving raw model data from the edge 115 and running context discovery algorithms to generate the model. The context discovery algorithms read the context of the edge naming conventions of the edge devices 161*a*-161*n* and determine what the naming conventions refer to. For example, the knowledge graph 251 can receive "TMP" during the modeling phase and determine that "TMP" relates to "temperature." The generated models are then published. The complex onboarding process includes the knowledge graph 250 receiving the raw model data, receiving point history data, and receiving site survey data. The knowledge graph 251 can then use these inputs to run the context discovery algorithms. The generated models can be edited and then the models are published. The standardized rollout process includes manually defining standard models in the cloud 105 and pushing the models to the edge 115.

The IoT layer 205 includes one or more components for device management, data ingest, and/or command/control of the edge devices 161*a*-161*n*. The components of the IoT layer 205 enable data to be ingested into, or otherwise received at, the IoT platform 125 from a variety of sources. For example, data can be ingested from the edge devices 161*a*-161*n* through process historians or laboratory information management systems. The IoT layer 205 is in communication with the edge connectors 165*a*-165*n* installed on the edge gateways 162*a*-162*n* through network 110, and the edge connectors 165*a*-165*n* send the data securely to the IoT platform 205. In some embodiments, only authorized data is sent to the IoT platform 125, and the IoT platform 125 only accepts data from authorized edge gateways 162*a*-162*n* and/or edge devices 161*a*-161*n*. Data may be sent from the edge gateways 162*a*-162*n* to the IoT platform 125 via direct streaming and/or via batch delivery. Further, after any network or system outage, data transfer will resume once communication is re-established and any data missed during the outage will be backfilled from the source system or from a cache of the IoT platform 125. The IoT layer 205 may also include components for accessing time series, alarms and events, and transactional data via a variety of protocols.

The enterprise integration layer 210 includes one or more components for events/messaging, file upload, and/or REST/OData. The components of the enterprise integration layer 210 enable the IoT platform 125 to communicate with third party cloud applications 211, such as any application(s)

operated by an enterprise in relation to its edge devices. For example, the enterprise integration layer 210 connects with enterprise databases, such as guest databases, customer databases, financial databases, patient databases, etc. The enterprise integration layer 210 provides a standard application programming interface (API) to third parties for accessing the IoT platform 125. The enterprise integration layer 210 also enables the IoT platform 125 to communicate with the OT systems 163a-163n and IT applications 164a-164n of the enterprise 160a-160n. Thus, the enterprise integration layer 210 enables the IoT platform 125 to receive data from the third party applications 211 rather than, or in combination with, receiving the data from the edge devices 161a-161n directly.

The data pipeline layer 215 includes one or more components for data cleansing/enriching, data transformation, data calculations/aggregations, and/or API for data streams. Accordingly, the data pipeline layer 215 can pre-process and/or perform initial analytics on the received data. The data pipeline layer 215 executes advanced data cleansing routines including, for example, data correction, mass balance reconciliation, data conditioning, component balancing and simulation to ensure the desired information is used as a basis for further processing. The data pipeline layer 215 also provides advanced and fast computation. For example, cleansed data is run through enterprise-specific digital twins. The enterprise-specific digital twins can include a reliability advisor containing process models to determine the current operation and the fault models to trigger any early detection and determine an appropriate resolution. The digital twins can also include an optimization advisor that integrates real-time economic data with real-time process data, selects the right feed for a process, and determines optimal process conditions and product yields.

The data pipeline layer 215 may also use models and templates to define calculations and analytics, and define how the calculations and analytics relate to the nodes (e.g., the edge devices 161a-161n). For example, a pump template can define pump efficiency calculations such that every time a pump is configured, the standard efficiency calculation is automatically executed for the pump. The calculation model defines the various types of calculations, the type of engine that should run the calculations, the input and output parameters, the preprocessing requirement and prerequisites, the schedule, etc. The actual calculation or analytic logic may be defined in the template or it may be referenced. Thus, the calculation model can be used to describe and control the execution of a variety of different process models. Calculation templates can be linked with the node templates such that when a node (e.g., edge device 161a-161n) instance is created, any associated calculation instances are also created with their input and output parameters linked to the appropriate attributes of the node (e.g., edge device 161a-161n).

The IoT platform 125 can support a variety of different analytics models including, for example, first principles models, empirical models, engineered models, user-defined models, machine learning models, built-in functions, and/or any other types of analytics models. Fault models and predictive maintenance models will now be described by way of example, but any type of models may be applicable.

Fault models are used to compare current and predicted enterprise 160a-160n performance to identify issues or opportunities, and the potential causes or drivers of the issues or opportunities. The IoT platform 125 includes rich hierarchical symptom-fault models to identify abnormal conditions and their potential consequences. For example, the IoT platform 125 can drill down from a high-level condition to understand the contributing factors, as well as determining the potential impact a lower level condition may have. There may be multiple fault models for a given enterprise 160a-160n looking at different aspects such as process, equipment, control, and/or operations. Each fault model can identify issues and opportunities in their domain, and can also look at the same core problem from a different perspective. An overall fault model can be layered on top to synthesize the different perspectives from each fault model into an overall assessment of the situation and point to the true root cause.

When a fault or opportunity is identified, the IoT platform 125 can make recommendations about the best corrective actions to take. Initially, the recommendations are based on expert knowledge that has been pre-programmed into the system by process and equipment experts. A recommendation services module presents this information in a consistent way regardless of source, and supports workflows to track, close out, and document the recommendation follow-up. The recommendation follow-up can be used to improve the overall knowledge of the system over time as existing recommendations are validated (or not) or new cause and effect relationships are learned by users and/or analytics.

The models can be used to accurately predict what will occur before it occurs and interpret the status of the installed base. Thus, the IoT platform 125 enables operators to quickly initiate maintenance measures when irregularities occur. The digital twin architecture of the IoT platform 125 can use a variety of modeling techniques. The modeling techniques can include, for example, rigorous models, fault detection and diagnostics (FDD), descriptive models, predictive maintenance, prescriptive maintenance, process optimization, and/or any other modeling technique.

The rigorous models can be converted from process design simulation. In this manner, process design is integrated with feed conditions and production requirement. Process changes and technology improvement provide business opportunities that enable more effective maintenance schedule and deployment of resources in the context of production needs. The fault detection and diagnostics include generalized rule sets that are specified based on industry experience and domain knowledge and can be easily incorporated and used working together with equipment models. The descriptive models identify a problem and then the predictive models can determine possible damage levels and maintenance options. The descriptive models can include models for defining the operating windows for the edge devices 161a-161n.

Predictive maintenance includes predictive analytics models developed based on rigorous models and statistic models, such as, for example, principal component analysis (PCA) and partial least square (PLS). Machine learning methods can be applied to train models for fault prediction. Predictive maintenance can leverage FDD-based algorithms to continuously monitor individual control and equipment performance. Predictive modeling is then applied to a selected condition indicator that deteriorates in time. Prescriptive maintenance includes determining what is the best maintenance option and when it should be performed based on actual conditions rather than time-based maintenance schedule. Prescriptive analysis can select the right solution based on the company's capital, operational, and/or other requirements. Process optimization is determining optimal conditions via adjusting set-points and schedules. The optimized set-points and schedules can be communicated directly to the underlying controllers, which enables automated closing of the loop from analytics to control.

The data insight layer 220 includes one or more components for time series databases (TDSB), relational/document databases, data lakes, blob, files, images, and videos, and/or an API for data query. When raw data is received at the IoT platform 125, the raw data can be stored as time series tags or events in warm storage (e.g., in a TSDB) to support interactive queries and to cold storage for archive purposes. Data can further be sent to the data lakes for offline analytics development. The data pipeline layer 215 can access the data stored in the databases of the data insight layer 220 to perform analytics, as detailed above.

The application services layer 225 includes one or more components for rules engines, workflow/notifications, KPI framework, BI, machine learning, and/or an API for application services. The application services layer 225 enables building of applications 146a-d. The applications layer 230 includes one or more applications 146a-d of the IoT platform 125. For example, the applications 146a-d can include a buildings application 146a, a plants application 146b, an aero application 146c, and other enterprise applications 146d. The applications 146 can include general applications 146 for portfolio management, node management, autonomous control, and/or any other custom applications. Portfolio management can include the KPI framework and a flexible user interface (UI) builder. Node management can include node performance and node health. Autonomous control can include energy optimization and predictive maintenance. As detailed above, the general applications 146 can be extensible such that each application 146 can be configurable for the different types of enterprises 160a-160n (e.g., buildings application 146a, plants application 146b, aero application 146c, and other enterprise applications 146d).

The applications layer 230 also enables visualization of performance of the enterprise 160a-160n. For example, dashboards provide a high-level overview with drill downs to support deeper investigations. Recommendation summaries give users prioritized actions to address current or potential issues and opportunities. Data analysis tools support ad hoc data exploration to assist in troubleshooting and process improvement.

The core services layer 235 includes one or more services of the IoT platform 125. The core services 235 can include data visualization, data analytics tools, security, scaling, and monitoring. The core services 235 can also include services for tenant provisioning, single login/common portal, self-service admin, UI library/UI tiles, identity/access/entitlements, logging/monitoring, usage metering, API gateway/dev portal, and the IoT platform 125 streams.

As described above, EOM 250 and knowledge graphs 251 of FIG. 2 may be central to the definition of relationships between devices and nodes of the network. Accordingly, exemplary functions and features of an exemplary EOM consistent with the present disclosure will now be described with reference to FIGS. 3-11.

Figure 3:
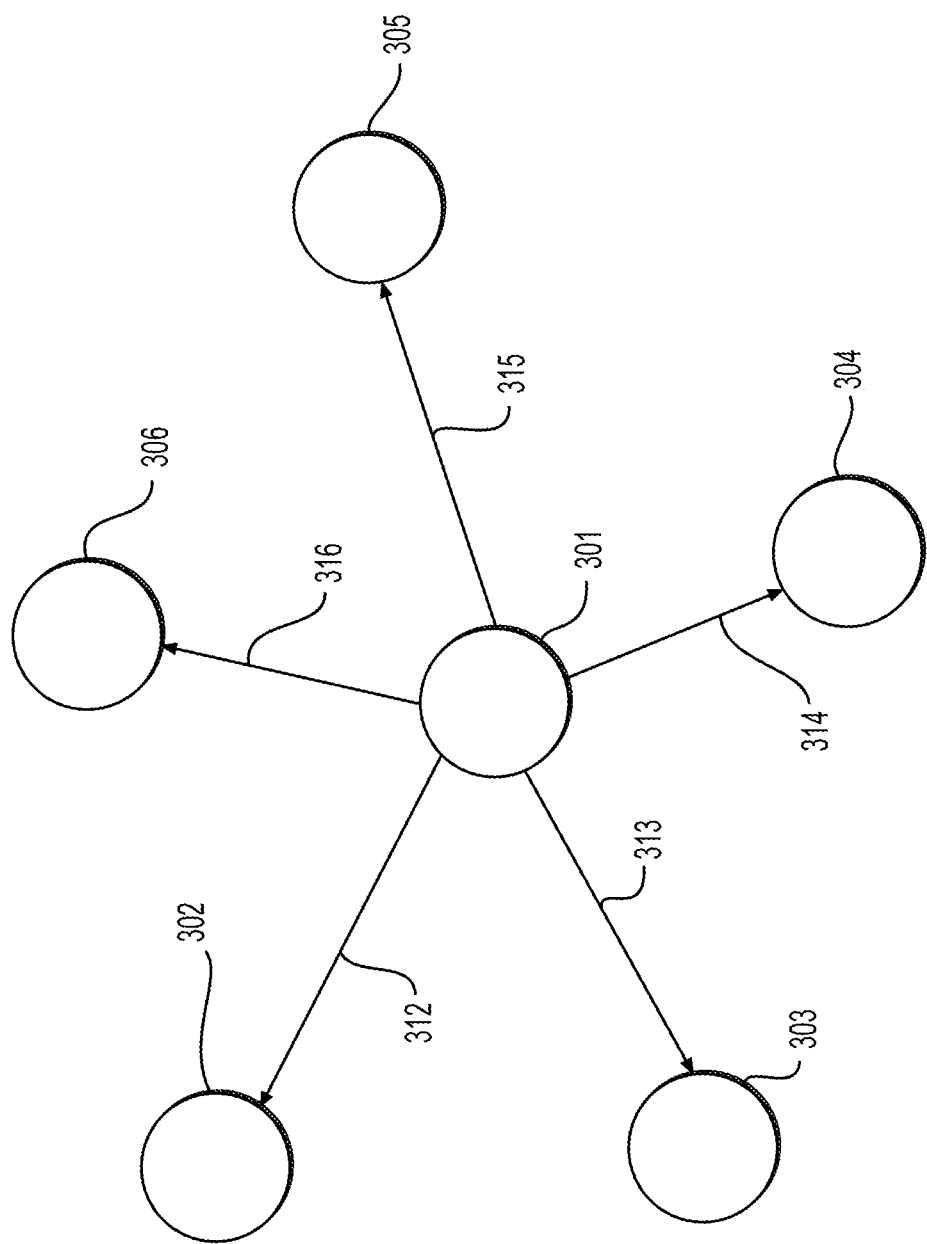
FIG. 3 depicts an exemplary schematic diagram of nodes and links of an exemplary extensible object model (EOM) of the type depicted in FIG. 2, according to an exemplary embodiment.

FIG. 3 depicts an exemplary diagram of nodes and connectors of a knowledge graph 251 of an EOM 250, according to an exemplary embodiment. For example, nodes 301-306 may be connected together by links 312-316 (e.g., connectors). Each of the nodes 301-306 may correspond to a node of an enterprise (e.g., the edge devices 161a-161n), and each of the links 312-316 may describe a relationship between two or more of the nodes. For example, node 301 may correspond to a first node that is connected to one or more second nodes 302-306. The relationship between the first node and each second node may be defined using connectors (e.g., links 312-316). The nodes may be physical entities and/or non-physical entities. Non-limiting examples of physical entities may be a chiller, an air handling unit (AHU), a fan, dampers, coils, a sensor, a zone control system, a wall module, a return air fan, and a cooling/heating coil, etc. Non-limiting examples of virtual or non-physical entities may be data, such as information technology (IT) data, or a virtual machine or its components and modules. Additionally, when a relationship is defined, a probability for each relationship may also be defined (e.g., such that the relationship is a "probabilistic relationship" as opposed to a "deterministic relationship"). Thus, each relationship may have a probability associated with it, where the nature, strength, etc. of the relationship is uncertain and is defined by a probability (i.e., a likelihood) that the defined relationship is true.

Figure 4:
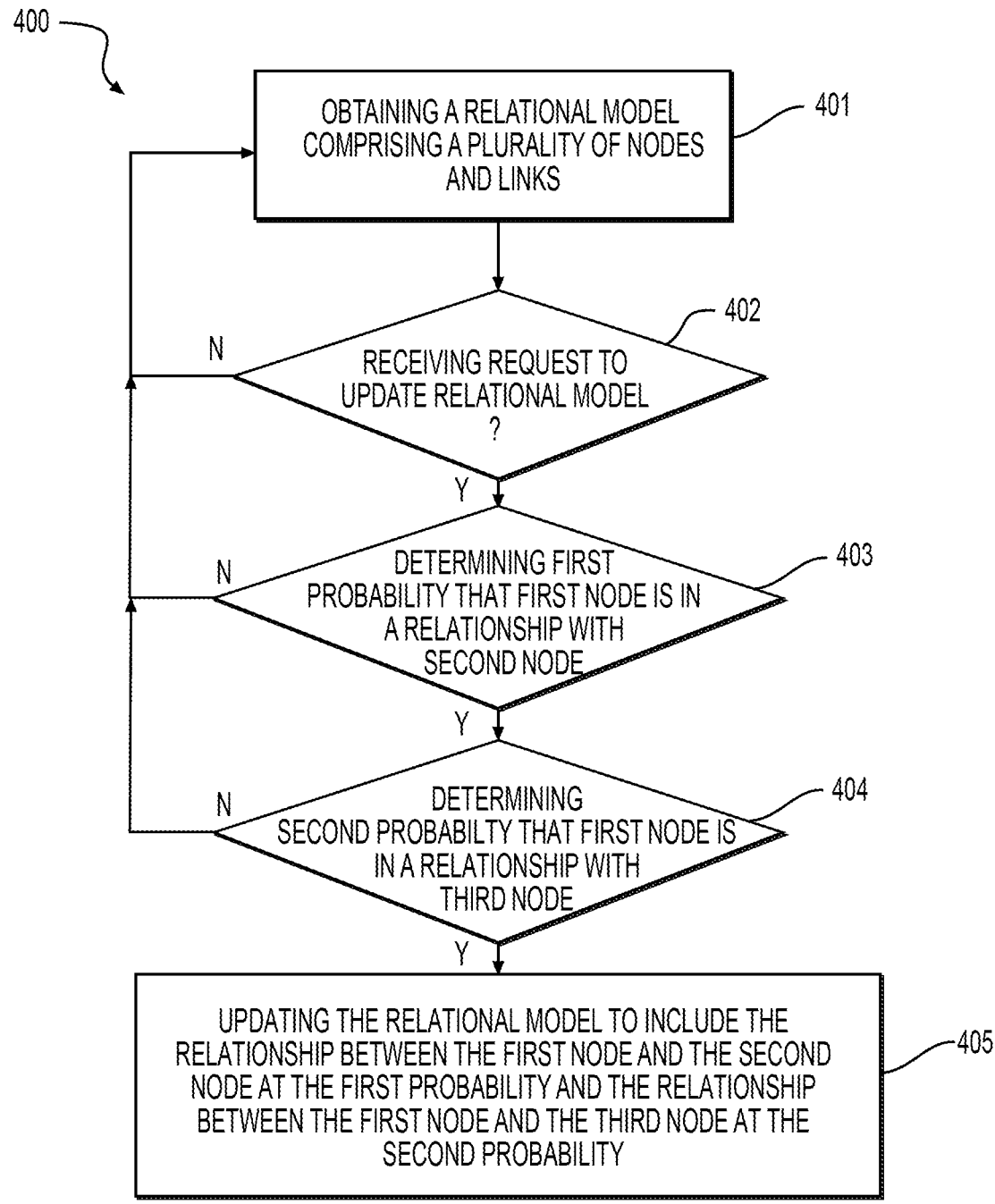
FIG. 4 depicts an exemplary flowchart illustrating a method of obtaining and updating a relational model to define an extensible object model, according to an exemplary embodiment.

FIG. 4 depicts an exemplary flowchart illustrating a method 400 of updating a relational model (e.g., knowledge graph 251, property graph) so as to define an extensible object model of nodes across a network or an enterprise, according to an exemplary embodiment. According to one embodiment, the method includes one or more of the following steps. In step 401, the method includes obtaining a relational model. The relational model includes a plurality of nodes (e.g., a logical representation of one or more attributes of a physical device, its current state and one or more calculations that may be performed using the node's data as well as other nodes' data) and a plurality of connectors, each of the connectors of the plurality of connectors connecting one or more nodes of the plurality of nodes, each node corresponding to a node (e.g., physical entities, source entities that supply target entities, target entities that are supplied by source entities, information technology (IT) data, etc.) and each connector corresponding to a relationship between a first node and a second node. For example, in a heating, ventilation, and air conditioning (HVAC) system, a relationship between a first node (e.g., air handling unit (AHU)) and a second node (e.g., zones of a building) may be that the first node supplies the second node with an entity, a material, and/or a substance, etc. (e.g., air). As another example, a chiller may supply an air handling unit with chilled water. The chilled water may be chilled to several degrees below a desired temperature of occupants in the building. Other examples of nodes in an HVAC system may be fans, dampers, coils, sensors, zone control system, and/or wall modules, etc. Other examples of relationships may be that a first node contains a second node. Embodiments are not limited to the above examples.

In step 402, the method includes determining whether a request is received to update the relational model, the request comprising information corresponding to an added and/or edited first node. For example, a new node may be added to the relational model and/or a previously defined node may be edited and/or updated.

If a request is received to update the relational model (e.g., step 402-Y), then the method 400 may include determining a first probability that the first node is in a relationship with a second node (e.g., step 403). For example, if the first node is an AHU and the second node is a fan, then a probability that the AHU contains a fan may be determined. The probabilities may be provided by a user and/or may be derived using an algorithm. The algorithm may use building semantics to derive relationships among devices. For example, a building management system (BMS) may produce different types of event data (e.g., alarm data). The event data (e.g., alarm data) may be used to determine the probable relationships between two devices. The algorithm may list all possible relationships between devices by searching a group of records (e.g., alarm records) within a given time window. In that time window, the algorithm may select different events (e.g., alarm types) and identify the devices that generated the event (e.g. alarm) in that time window. The algorithm may reference a template of relationships to determine if any two devices in that time window could potentially be involved in a relationship. A combination of source device, target device and relationship type may be saved in a list. As the algorithm traverses through a list of records (e.g., alarm records), the same combinations may repeat several times. The frequency of occurrence of the combination of source device, target device, and/or relationship type may also be recorded. Thus, the algorithm has obtained list of probable relationships along with the frequency. The algorithm may determine a probability of every relationship.

If the first probability is determined (e.g., step 403-Y), then the method may include determining a second probability that the first node is in a relationship with a third node (e.g., step 404). For example, if the third node is a damper, then a probability that the AHU contains a damper may be determined.

If the second probability is determined (e.g. step 404-Y), the method may include updating the relational model to include the relationship between the first node and the second node at the first probability and the relationship between the first node and the third node at the second probability (e.g., step 405). To build the relational model (e.g., knowledge graph 251), probabilities may be determined for every node and every relationship between nodes in the relational model. While a first and second probability is detailed in the exemplary embodiment, it is understand there may be any number of probabilities determined, as desired.

Additionally, the method may include providing a graphical user interface including visual representations of the nodes and the connectors of a relational model, and receiving and processing requests to update the relational model based on user inputs to the graphical user interface. An exemplary method may further include responding to a query about a node. For example, a request may be made, e.g., by a user, to provide a list of all the chillers on a west side of a building and their efficiency over a certain time period (e.g., a weekday). Further, if an action is performed on a first node (e.g., a chiller temperature adjusted), each other node in the relational model may be adjusted to account for the action performed on the first node. In some cases, the visual representations between nodes and connectors, as well as the queries received and the information generated about the nodes and connectors may be a function of the probabilities computed regarding the relationships between nodes of the network. The probabilities may be calculated as a function of occurrences between nodes of the network with each other, and types of data transmitted between nodes of the network, as will be described in more detail below.

Figure 5:
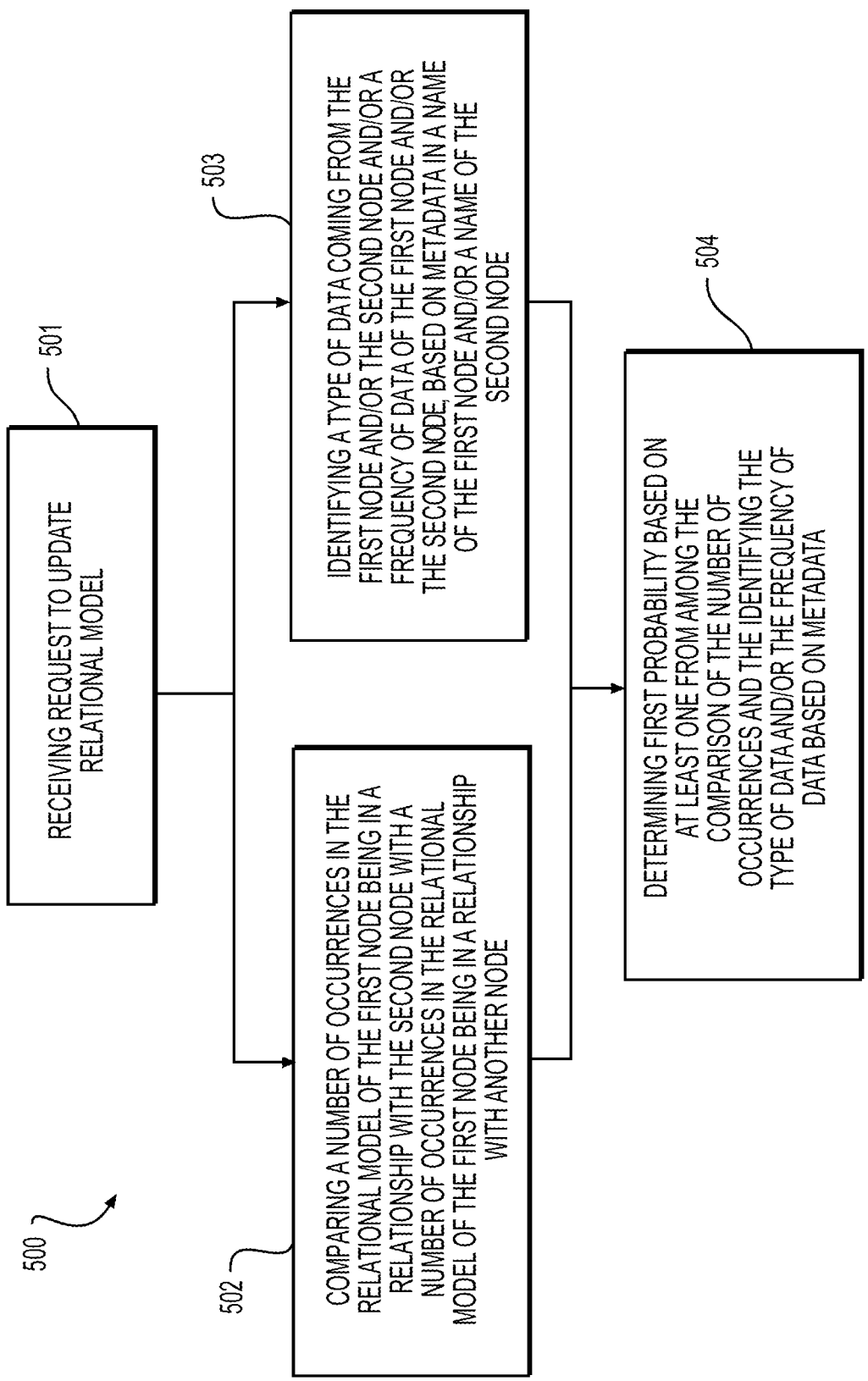
FIG. 5 depicts an exemplary flowchart illustrating a method of determining a first probability between nodes of an extensible object model, according to an exemplary embodiment.

FIG. 5 depicts an exemplary method 500 of determining such probabilities based on occurrences and data types, for example, upon receiving a request to update the relational model, according to an exemplary embodiment. According to one embodiment, the method includes one or more of the following steps. In step 501, the method includes receiving a request to update the relational model. In step 502, the method includes comparing a number of occurrences in the relational model of the first node being in a relationship with the second node with a number of occurrences in the relational model of the first node being in a relationship with another node. For example, if the first node is an AHU, the second node is a fan, and a third node is a damper, the method may include determining a number of occurrences in which an AHU contains a fan, and determining a number of occurrences in which an AHU contains a damper. A probability that the AHU contains a fan and/or a damper may be based on a comparison of the numbers of occurrences.

In step 503, the method includes identifying a type of data coming from the first node and/or the second node. For example, a numerical range of the data may provide information about a first node and/or a second node. For example, if the data is in a range of 50-100, it may be determined that the node is a thermostat. If the data is in a range of 2000-5000, it may be determined that the node is a motor. As another example, a frequency of data may provide information about the first node and/or the second node. For example, if the data identifies that an event occurs during working hours, the node may be determined to be an occupant sensor. If the data identifies that an event occurs once or twice a day, the node may be determined to be a light switch. As another example, metadata in a name of the first node and/or a name of the second node may provide information about a first node and/or a second node. For example, if metadata refers to "XYZpump," then the method may include determining the node to be a pump. As another example, if metadata refers to "ABCchiller," then the method may include determining the node to be a chiller.

In step 504, the method includes determining the first probability based on at least one from among the comparison of the number of occurrences and the identifying the type of data and/or the frequency of data based on metadata. For example, a probability that a first node is in a relationship with a second node and/or a third node may be determined based on comparing the number of occurrences between the nodes and/or identifying a type of data and/or frequency of data using the metadata.

According to one or more embodiments, data input to the system may be received from many different sources and the data may not initially be ready for use by the system. For example, if an Indian subsidiary and a US subsidiary are both purchasing materials from a supplier, they may use different terms to describe the same goods and/or services. According to one or more embodiments, the data received from the many different sources is ingested and cleaned for use by the system.

Figure 6:
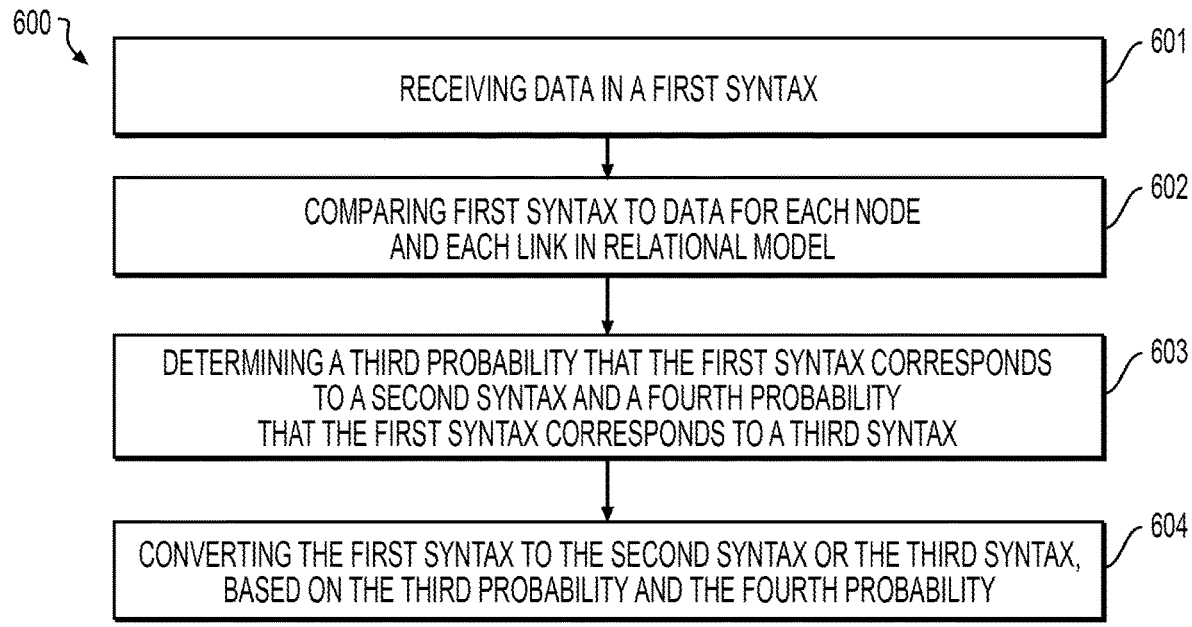
FIG. 6 depicts an exemplary flowchart illustrating a method of ingesting and cleaning data supplied to the relational model, according to an exemplary embodiment.

FIG. 6 depicts an exemplary method 600 of ingesting and cleaning data, according to an exemplary embodiment. According to one embodiment, the method includes one or more of the following steps. In step 601, the method includes receiving data, the received data in a first syntax. For example, data may be received having a syntax of "temp1234." In step 602, the method includes comparing the first syntax to a uniform syntax. For example, for a temperature sensor, a uniform syntax may be "temperature1234." The first syntax may be compared to data for each node and each connector in the entire relational model. In step 603, the method includes determining, based on the comparing, a third probability that the first syntax corresponds to a second syntax and a fourth probability that the first syntax corresponds to a third syntax (e.g., probability that the intended node is temperature1234' vs. temporary1234'). That is, a determination may be made as to whether "temp1234" is intended to refer to "temperature 1234" or "temporary1234." This process may be performed for each node in the relational model. In step 604, the method includes converting, based on the third probability and the fourth probability, the first syntax to the second syntax or the third syntax. For example the intended node may be selected based on the determined probabilities.

Figure 7:
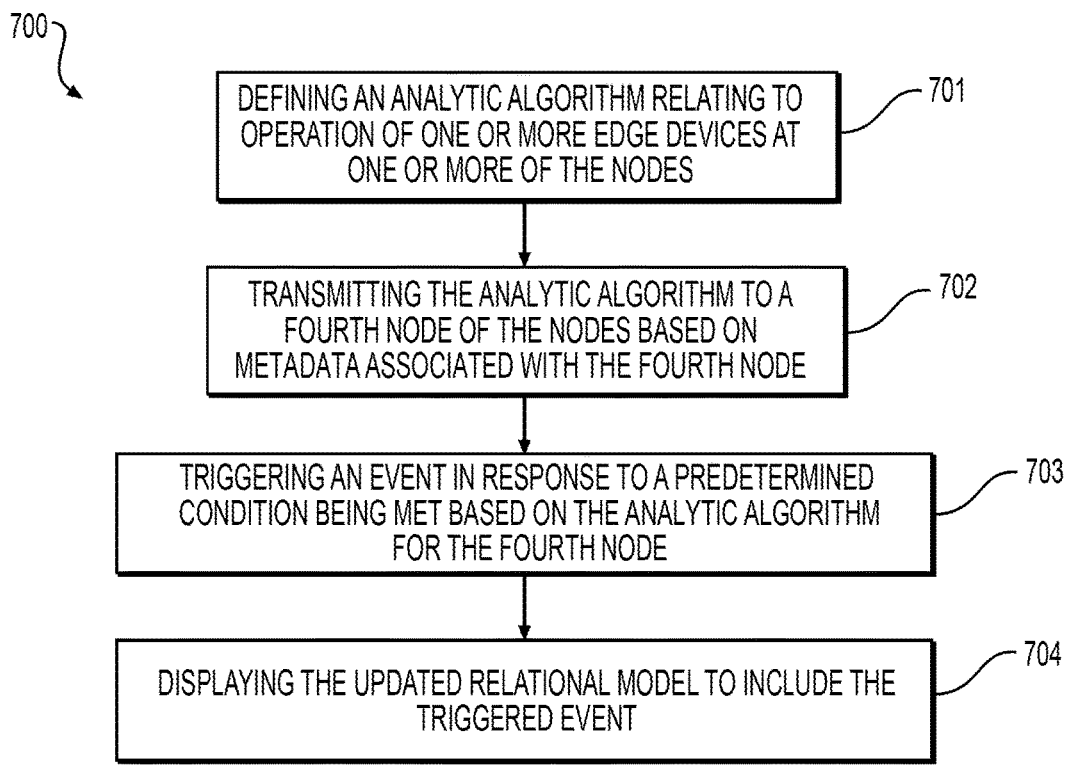
FIG. 7 depicts an exemplary flowchart illustrating a method of defining analytic models and providing analytic models to one or more edge devices of the network, according to an exemplary embodiment.

After the data is ingested and cleaned, the data may be pushed to edge devices 161*a*-161*n*. FIG. 7 depicts an exemplary method 700 of providing data to one or more edge devices 161*a*-161*n*, according to an exemplary embodiment. According to one embodiment, the method includes one or more of the following steps. In step 701, the method includes defining an analytic algorithm (e.g., using metadata) relating to operation of one or more edge devices 161*a*-161*n* at one or more of the nodes. By optimizing data between cloud 105 and edge devices 161*a*-161*n*, throughput may be increased and latency reduced.

In step 702, the method includes transmitting the analytic algorithm to a fourth node of the nodes based on metadata associated with the fourth node. For example, using metadata, it may be determined that the fourth node is a thermal camera. In step 703, the method includes, in response to a predetermined condition being met based on the analytic algorithm for the fourth node, triggering an event. For example, if a person walks by a thermal camera with a body temperature greater than a value, then the method may include identifying a measurement of how risky building is. In step 704, the method includes displaying the updated relational model to include the triggered event. Exemplary embodiments are not limited to the above examples.

Figure 8:
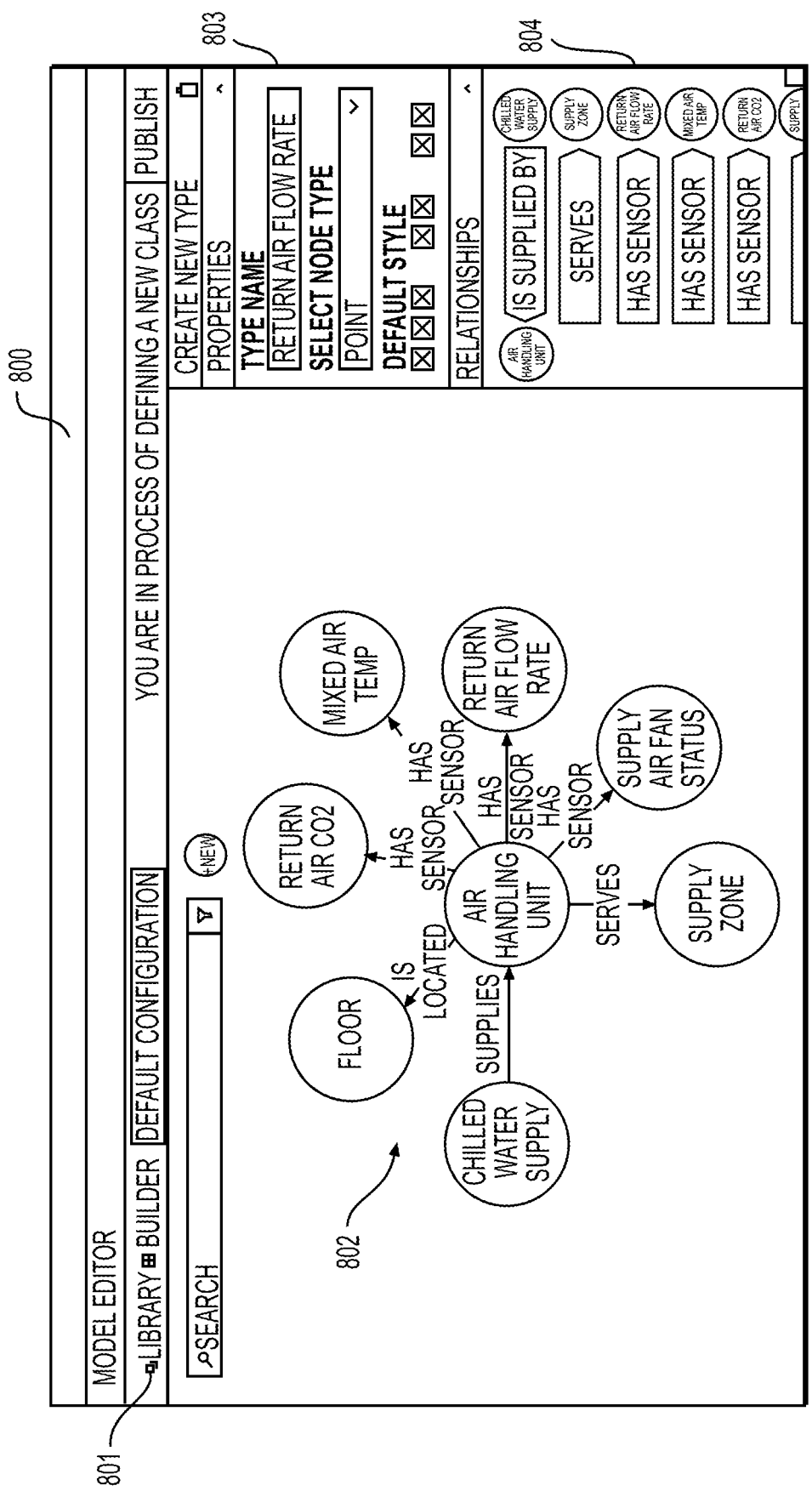
FIG. 8 depicts an exemplary diagram of a first mode of defining and editing nodes and relationships of the relational model, according to an exemplary embodiment.

FIG. 8 depicts an exemplary diagram 800 of a first mode of defining and editing nodes and relationships, according to an exemplary embodiment. For example, in a library mode (e.g., icon 801), a relational model 802 may include a number of nodes and connectors for defining nodes and relationships between the nodes. For example, an exemplary relational model 802 may identify that the chilled water supply may supply water to the AHU. The AHU may: (1) be located on the floor; (2) have a sensor for return air carbon dioxide; (3) have a sensor for detecting a mixed air temperature; (4) have a sensor for detecting a return air flow rate; (5) have a sensor for detecting a supply air fan status; and/or (6) serve a supply zone. Graphical user interface (GUI) area 803 may be used to define and edit nodes and/or node types. For example, the type name may be entered by a user and a node type may be selected from a drop down menu. In GUI area 804, the relationships for each node may be defined and/or edited. For example, the AHU may be edited to include the relationships illustrated in relational model 802. Additionally, for each node and each relationship, a user may input a probability that a node is in a relationship with other nodes. The GUI is dynamic in nature, and the interface is adaptable to any type of data.

Figure 9:
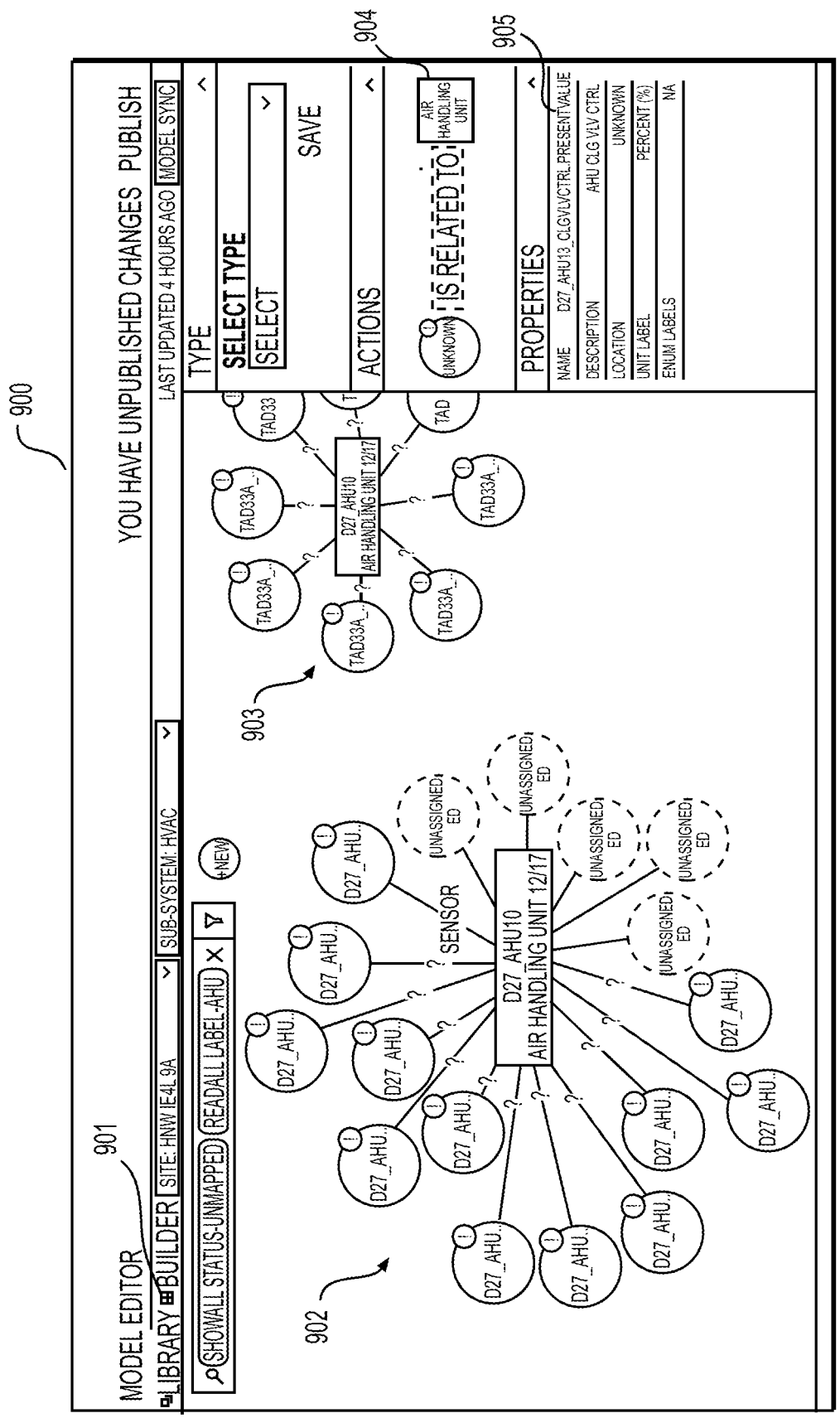
FIG. 9 depicts an exemplary diagram of a second mode of defining and editing nodes and relationships of the relational model, in which multiple groups of nodes and links may be edited at a time, according to an exemplary embodiment.

FIG. 9 depicts an exemplary diagram 900 of a second mode of defining nodes and relationships, according to an exemplary embodiment. For example, in a builder mode (e.g., icon 901), multiple groups of nodes and connectors may be edited at a time. For example, group 902 may define a first set of air handling units that are connected to each other. Group 903 may define a second set of air handling units that are connected to each other. GUI area 904 may be used to define relationships between nodes, and GUI area 905 may be used to define properties for each group node and/or group of nodes. Additionally, for each group node and each relationship, a user may input a probability that a group of nodes is in a relationship with another group of nodes.

Figure 10:
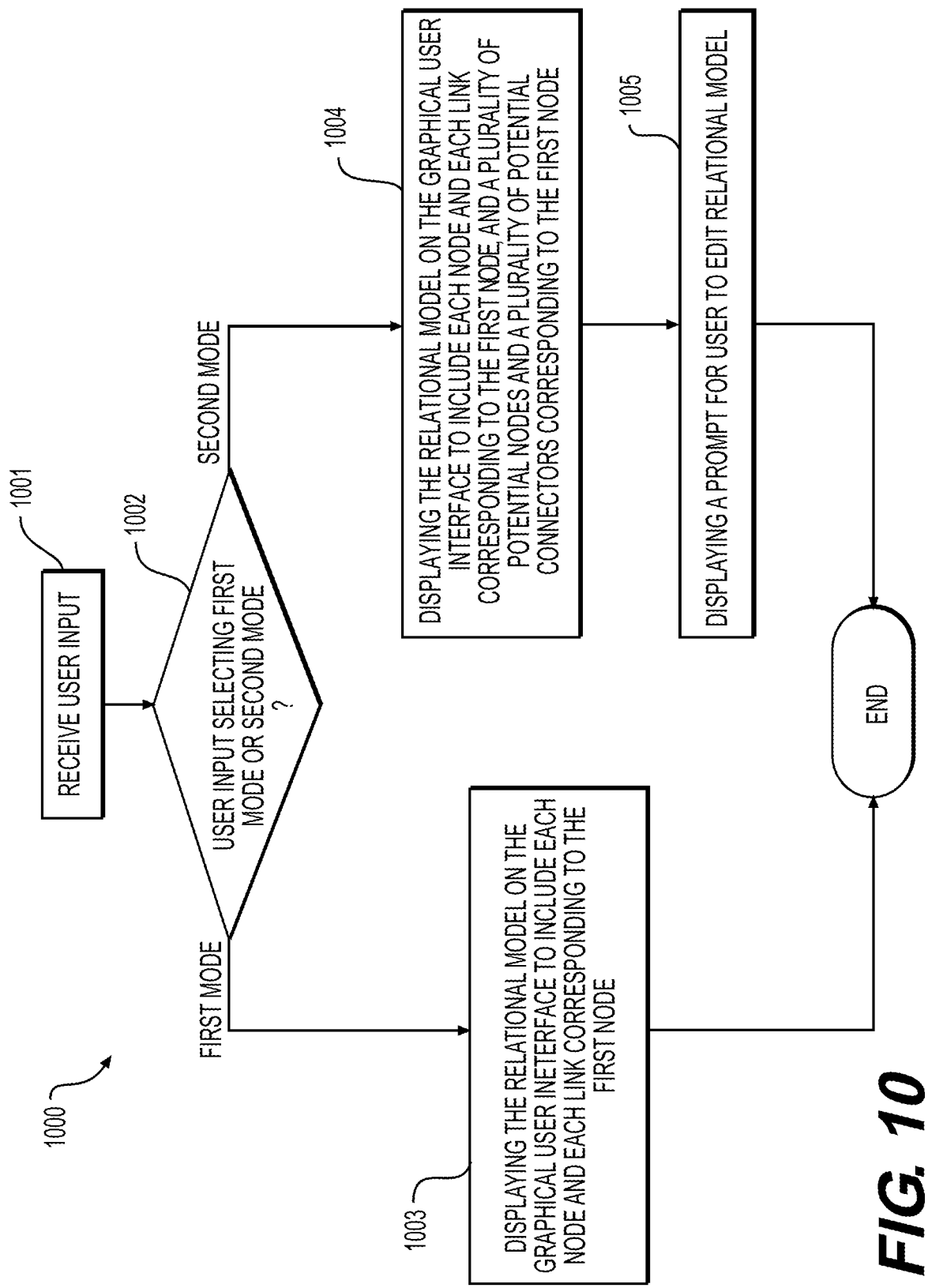
FIG. 10 depicts an exemplary flowchart illustrating a method of switching between a first mode and a second mode of a relational model editor based on user inputs, according to an exemplary embodiment.

FIG. 10 depicts an exemplary method 1000 of providing a first mode and a second mode, according to an exemplary embodiment. According to one embodiment, the first mode is a library mode 800 and the second mode is a builder mode 900. The method includes one or more of the following steps. In step 1001, the method includes receiving a user input on a graphical user interface to select between a first mode and a second mode (e.g., library mode 800 vs. builder mode 900). In response to the user input selecting the first mode (e.g., library mode), the method includes displaying the relational model on the graphical user interface to include each node and each connector corresponding to a first node (e.g. step 1003). In response to the user input selecting the second mode (e.g., builder mode), the method includes displaying the relational model on the graphical user interface to include each node and each connector corresponding to the first node, and a plurality of potential nodes and a plurality of potential connectors corresponding to the first node (e.g., step 1004), and displaying a prompt for a user to edit the relational model (e.g., step 1005). Additionally, a user may edit or add a probability for each relationship of each node in the relational model.

Figure 11:
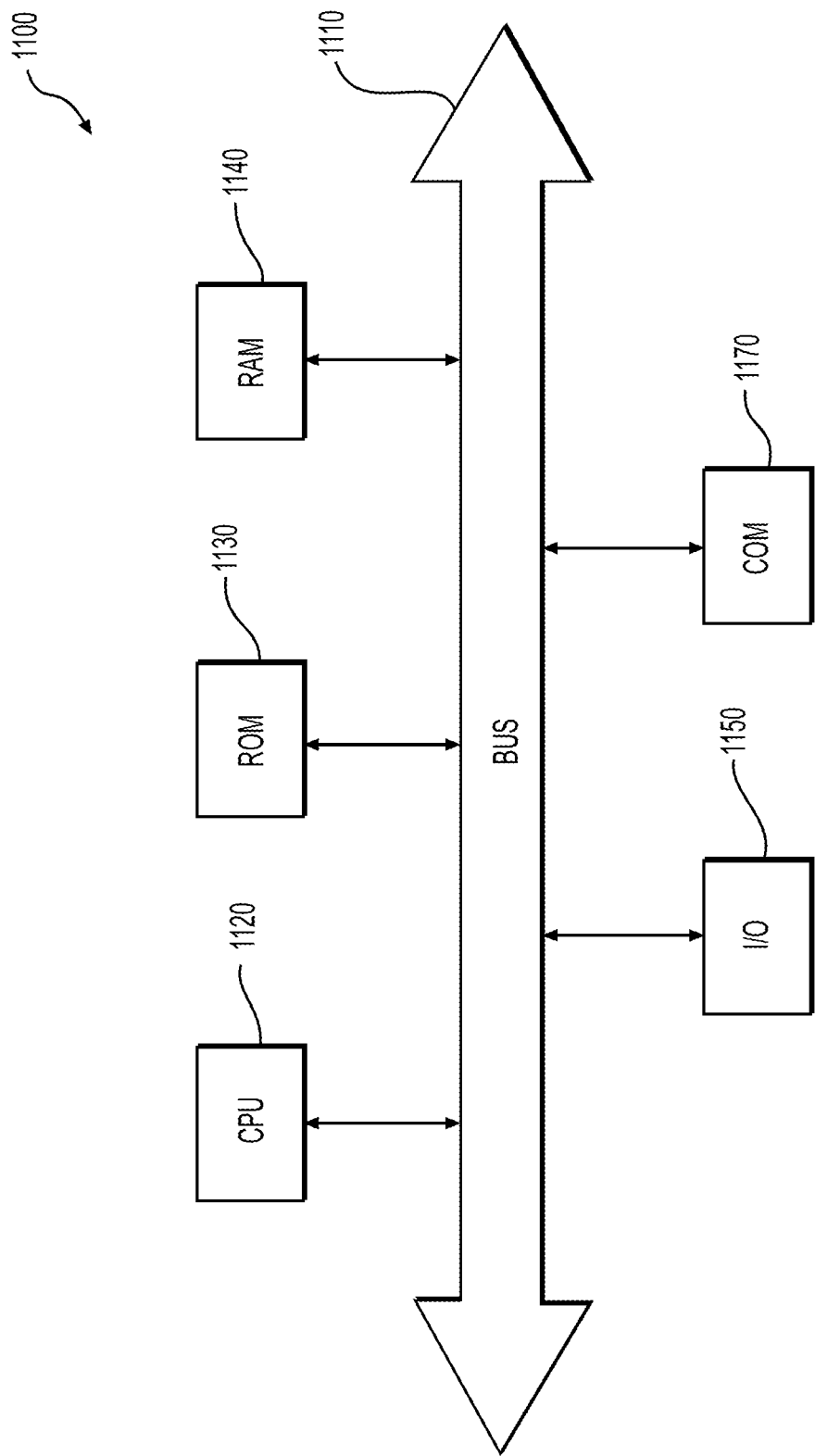
FIG. 11 depicts an example system that may execute techniques presented herein.

FIG. 11 depicts an example system 1100 that may execute techniques presented herein. FIG. 11 is a simplified functional block diagram of a computer that may be configured to execute techniques described herein, according to exemplary embodiments of the present disclosure. Specifically, the computer (or "platform" as it may not be a single physical computer infrastructure) may include a data communication interface 1160 for packet data communication. The platform also may include a central processing unit ("CPU") 1120, in the form of one or more processors, for executing program instructions. The platform may include an internal communication bus 1110, and the platform also may include a program storage and/or a data storage for various data files to be processed and/or communicated by the platform such as ROM 1130 and RAM 1140, although the system 1100 may receive programming and data via network communications. The system 1100 also may include input and output ports 1150 to connect with input and output devices such as keyboards, mice, touchscreens, monitors, displays, etc. Of course, the various system functions may be implemented in a distributed fashion on a number of similar platforms, to distribute the processing load. Alternatively, the systems may be implemented by appropriate programming of one computer hardware platform.

The general discussion of this disclosure provides a brief, general description of a suitable computing environment in which the present disclosure may be implemented. In one embodiment, any of the disclosed systems, methods, and/or graphical user interfaces may be executed by or implemented by a computing system consistent with or similar to that depicted and/or explained in this disclosure. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure also may be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Program aspects of the technology may be thought of as "products" or "articles of manufacture" typically in the form of executable code and/or associated data that is carried on or embodied in a type of machine-readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

One or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A method, comprising:
    obtaining a relational model, the relational model comprising a plurality of nodes and a plurality of links, each of the links of the plurality of links connecting one or more nodes of the plurality of nodes, and each link corresponding to a relationship between a first node and a second node, wherein the one or more nodes represent one or more devices associated with an enterprise;
    receiving a request to update the relational model, the request comprising information corresponding to an added and/or edited first node;
    determining a first probability that the first node is in a relationship with the second node and a second probability that the first node is in a relationship with a third node, wherein determining the first probability comprises comparing a number of occurrences in the relational model of the first node being in a relationship with the second node with a number of occurrences in the relational model of the first node being in a relationship with another node; and
    updating the relational model to include the relationship between the first node and the second node at the first probability and the relationship between the first node and the third node at the second probability.

2. The method of claim 1, wherein the determining the first probability further comprises:
    identifying a type of data coming from the first node and/or the second node and/or a frequency of data of the first node and/or the second node, based on metadata in a name of the first node and/or a name of the second node.

3. The method of claim 1, wherein the receiving the request to update the relational model comprises:
    receiving data, the received data in a first syntax;
    comparing the first syntax to a syntax corresponding to data for each node and each link in the relational model;
    determining, based on the comparing, a third probability that the first syntax corresponds to a second syntax and a fourth probability that the first syntax corresponds to a third syntax; and
    converting, based on the third probability and the fourth probability, the first syntax to the second syntax or the third syntax.

4. The method of claim 1, further comprising:
    defining an analytic algorithm relating to operation of one or more edge devices at the one or more of the nodes;
    transmitting the analytic algorithm to a fourth node of the nodes based on metadata associated with the fourth node;
    in response to a predetermined condition being met based on the analytic algorithm for the fourth node, triggering an event; and
    displaying the updated relational model to include the triggered event.

5. The method of claim 1, further comprising a graphical user interface, the graphical user interface comprising visual representations of the plurality of nodes and the plurality of links, and the receiving the request to update the relational model comprises receiving a user input on the graphical user interface.

6. The method of claim 1, wherein the obtaining the relational model comprises receiving a user input on a graphical user interface to select between a first mode and a second mode;
    in response to the user input selecting the first mode, displaying the relational model on the graphical user interface to include each node and each link corresponding to the first node; and
    in response to the user input selecting the second mode, displaying the relational model on the graphical user interface to include each node and each link corresponding to the first node, and a plurality of potential nodes and a plurality of potential links corresponding to the first node, and displaying a prompt for a user to edit the relational model.

7. The method of claim 1, wherein the request to update the relational model further comprises information corresponding to an added and/or edited fifth node and/or information corresponding to an added and/or edited relationship between the first node and the fifth node.

8. A system, comprising:
    a processor; and
    a memory,
    the processor:
        obtaining a relational model, the relational model comprising a plurality of nodes and a plurality of links, each of the links of the plurality of links connecting one or more nodes of the plurality of nodes, and each link corresponding to a relationship between a first node and a second node, wherein the one or more nodes represent one or more devices associated with an enterprise;
        receiving a request to update the relational model, the request comprising information corresponding to an added and/or edited first node;
        determining a first probability that the first node is in a relationship with the second node and a second probability that the first node is in a relationship with a third node, wherein determining the first probability comprises comparing a number of occurrences in the relational model of the first node being in a relationship with the second node with a number of occurrences in the relational model of the first node being in a relationship with another node; and
        updating the relational model to include the relationship between the first node and the second node at the first probability and the relationship between the first node and the third node at the second probability.

9. The system of claim 8, wherein the determining the first probability further comprises:
identifying a type of data coming from the first node and/or the second node and/or a frequency of data of the first node and/or the second node, based on metadata in a name of the first node and/or a name of the second node.

10. The system of claim 8, wherein the receiving the request to update the relational model comprises:
receiving data, the received data in a first syntax;
comparing the first syntax to a syntax corresponding to data for each node and each link in the relational model;
determining, based on the comparing, a third probability that the first syntax corresponds to a second syntax and a fourth probability that the first syntax corresponds to a third syntax; and
converting, based on the third probability and the fourth probability, the first syntax to the second syntax or the third syntax.

11. The system of claim 8, the processor further:
defining an analytic algorithm relating to operation of one or more edge devices at the one or more of the nodes;
transmitting the analytic algorithm to a fourth node of the nodes based on metadata associated with the fourth node;
in response to a predetermined condition being met based on the analytic algorithm for the fourth node, triggering an event; and
displaying the updated relational model to include the triggered event.

12. The system of claim 8, further comprising a graphical user interface, the graphical user interface comprising visual representations of the plurality of nodes and the plurality of links, and the receiving the request to update the relational model comprises receiving a user input on the graphical user interface.

13. The system of claim 8, wherein the obtaining the relational model comprises receiving a user input on a graphical user interface to select between a first mode and a second mode;
the processor further:
in response to the user input selecting the first mode, displaying the relational model on the graphical user interface to include each node and each link corresponding to the first node; and
in response to the user input selecting the second mode, displaying the relational model on the graphical user interface to include each node and each link corresponding to the first node, and a plurality of potential nodes and a plurality of potential links corresponding to the first node, and displaying a prompt for a user to edit the relational model.

14. The system of claim 8, wherein the request to update the relational model further comprises information corresponding to an added and/or edited fifth node and/or information corresponding to an added and/or edited relationship between the first node and the fifth node.

15. A non-transitory computer-readable storage medium storing instructions that, when executed by a processor, cause the processor to perform a method of:
obtaining a relational model, the relational model comprising a plurality of nodes and a plurality of links, each of the links of the plurality of links connecting one or more nodes of the plurality of nodes, and each link corresponding to a relationship between a first node and a second node, wherein the one or more nodes represent one or more devices associated with an enterprise;
receiving a request to update the relational model, the request comprising information corresponding to an added and/or edited first node;
determining a first probability that the first node is in a relationship with the second node and a second probability that the first node is in a relationship with a third node, wherein determining the first probability comprises comparing a number of occurrences in the relational model of the first node being in a relationship with the second node with a number of occurrences in the relational model of the first node being in a relationship with another node; and
updating the relational model to include the relationship between the first node and the second node at the first probability and the relationship between the first node and the third node at the second probability.

16. The non-transitory computer-readable storage medium of claim 15, wherein the determining the first probability further comprises:
identifying a type of data coming from the first node and/or the second node and/or a frequency of data of the first node and/or the second node, based on metadata in a name of the first node and/or a name of the second node.

17. The non-transitory computer-readable storage medium of claim 15, wherein the receiving the request to update the relational model comprises:
receiving data, the received data in a first syntax;
comparing the first syntax to a syntax corresponding to data for each node and each link in the relational model;
determining, based on the comparing, a third probability that the first syntax corresponds to a second syntax and a fourth probability that the first syntax corresponds to a third syntax; and
converting, based on the third probability and the fourth probability, the first syntax to the second syntax or the third syntax.

18. The non-transitory computer-readable storage medium of claim 15, further comprising:
defining an analytic algorithm relating to operation of one or more edge devices at the one or more of the nodes;
transmitting the analytic algorithm to a fourth node of the nodes based on metadata associated with the fourth node;
in response to a predetermined condition being met based on the analytic algorithm for the fourth node, triggering an event; and
displaying the updated relational model to include the triggered event.

19. The non-transitory computer-readable storage medium of claim 15, further comprising a graphical user interface, the graphical user interface comprising visual representations of the plurality of nodes and the plurality of links, and the receiving the request to update the relational model comprises receiving a user input on the graphical user interface.

20. The non-transitory computer-readable storage medium of claim 15, wherein the obtaining the relational model comprises receiving a user input on a graphical user interface to select between a first mode and a second mode;
in response to the user input selecting the first mode, displaying the relational model on the graphical user interface to include each node and each link corresponding to the first node; and
in response to the user input selecting the second mode, displaying the relational model on the graphical user interface to include each node and each link corresponding to the first node, and a plurality of potential nodes and a plurality of potential links corresponding to the first node, and displaying a prompt for a user to edit the relational model.

\* \* \* \* \*